United States Patent [19]

Hooykaas

[11] 4,398,956

[45] Aug. 16, 1983

[54] PROCESS FOR TREATING MOIST COMPOSITIONS CONTAINING POLLUTION-CAUSING SUBSTANCES

[75] Inventor: Carel W. J. Hooykaas, BT Rotterdam, Netherlands

[73] Assignee: Pelt & Hooykaas B.V., Rotterdam, Netherlands

[21] Appl. No.: 332,278

[22] Filed: Dec. 18, 1981

[30] Foreign Application Priority Data

Dec. 18, 1980 [NL] Netherlands .................. 8006884

[51] Int. Cl.$^3$ .............................................. C04B 31/10
[52] U.S. Cl. ...................................... 106/85; 106/105; 106/109; 106/120; 106/DIG. 1; 501/155
[58] Field of Search .................. 106/DIG. 1, 85, 105, 106/109, 120; 501/155

[56] References Cited

U.S. PATENT DOCUMENTS 3,926,795  11/1975  Selmeczi et al. ................... 106/109
4,018,617   4/1977  Nicholson .......................... 106/120

*Primary Examiner*—James Poer
*Attorney, Agent, or Firm*—Pollock, Vande Sande & Priddy

[57] ABSTRACT

A moist sludge as obtained from gases evolved during steel preparation in converters by blowing oxygen through said liquid steel is treated with 30% flue dust. Preferably the mixing is effected in two steps, in the first step 60% of the flue dust is added and the particles as obtained are mixed with the remaining flue dust in a second step without crushing the particles of the first step, particularly by using a whirling process.

10 Claims, No Drawings

PROCESS FOR TREATING MOIST COMPOSITIONS CONTAINING POLLUTION-CAUSING SUBSTANCES

BACKGROUND OF THE INVENTION

1. Field of the Invention

The present invention relates to a process for treating compositions containing a moist metal or metal compounds, particularly compositions containing extractable compounds which may be easily lixiviated from said compositions and cause pollution. More particularly, the present invention relates to a process of treating compositions comprising at least one solid product separated from the gases evolved during the preparation of steel in steel converters, which solid product comprises at least a metal or metal compound and calcium oxide compound.

2. Description of the Prior Art

In the production of steel, high blowing oxygen in molten iron and adding calcium oxide gases are evolved with products which are removed in a moist washing device and recovered in a precipitation tank in order to avoid environmental pollution due to these products.

In the past, it was possible to recycle the separated products to the blast furnaces wherein iron ore is used. Due to the presence of zinc in the starting iron ore pellets, it is now impossible to recycle the high amount of iron oxide containing separated product to the blast furnaces, as this would lead to unacceptable high zinc concentrations in the latter. This causes difficulties, as zinc evaporates and precipitates onto the controlling apparatus and valves used in the automated blast furnaces, so that operation of the latter is impaired.

On the other hand, this product is also known under the "oxy-sludge" as the product is difficult to handle due to its stickiness after removal of water in an amount as high as possible by means of a vacuum filter, so that this product cannot be used for valuable applications.

Attempts have been made to overcome this disadvantage by adding calcium oxide in order to obtain a product which can be handled more easily.

However, the addition of calcium oxide is relatively expensive in comparison with the value of the product obtained in the form of oxy-sludge. Moreover, the substances present in the sludge after this treatment may still be easily lixiviated, so that in open air storage in open air is impossible.

SUMMARY OF THE INVENTION

It is a an object of the invention to provide a simpler solution for processing such compositions.

This object is attained according to the invention in that the composition is mixed with a compound having pozzolanic properties, particularly flue dust.

It has been found that mixture of a moist sticky composition, such as a composition removed from the gases evolved in steel treated in steel converters with a compound having pozzolanic properties, results in a very appropriate product, particularly if mixed with 10% flue dust, more particularly 15% flue dust. By mixing a sticky sludge with a compound having pozzolanic properties, particularly flue dust, spheres of the sludge, coated with a skin of a compound having pozzolanic properties, are obtained during stirring of the mass.

It will be obvious that in this way a composition is obtained which is easy to handle and process, as the original sticky mass has lost its sticky properties.

By adding 35%, and preferably 30% of flue dust, a dry easily processable mass is obtained.

Moistening such a product containing 30% of flue dust provides a non-tacky mixture which is transformed into a hard material and then broken into particles. The formation of a hard material is due to the presence of the compound presenting pozzolanic properties.

A composition according to the invention is particularly suitable as material for road construction or sound insulation and as an additive in concrete, particularly heavy concrete. This is due to the high iron content of the "oxy-sludge".

Using said composition in concrete provides the additional advantage that less mortar and water are required in order to obtain a mix providing a good concrete quality.

Another use of the composition as obtained by means of the invention is as filler material in road construction.

Advantageously, the composition may contain up to 5% of a hydraulic agent or an activator activating the curing of the compound having pozzolanic properties, thus rapidly providing a hard product, which will gradually become harder due to the presence of the compound having pozzolanic properties. Such an activator may be cement calcium chloride, sodiumchloride or calcium oxide.

A preferred embodiment of the process of the invention comprises a first step in which the composition is mixed with the compound having pozzolanic properties in such an amount that small sphere-like particles are formed which are treated in a second step in the presence of a further amount of said compound, without crushing said particles. Crushing can be particularly avoided by subjecting the particles to a whirling action.

By applying this preferred embodiment, particularly small spherelike particles are obtained, and an amount of drying agent in the form of flue dust can be saved.

Preferably ⅓ to ⅔ of the total amount of the compound having pozzolanic properties is used in the first step and the remaining amount in the second step.

In a particularly preferred embodiment of the invention, the final composition is obtained by adding at least 10% and preferably at most 35% of a compound having pozzolanic properties.

It is recommended to mix 600 to 800 kg of sludge, particularly oxy-sludge, with 120 to 180 kg of the compound having pozzolanic properties in the first step, and to mix the broken particles of the first step with 70 to 130 kg of the compound having pozzolanic properties.

The sphere-like particles obtained in the process of the invention may be formed to a solid mass to be stored in the open air, or a mass the spherelike particles may be compressed.

The amount of compound having pozzolanic properties should preferably not bind more than 35% of water as otherwise a doughlike mass is obtained, which is not appropriately processable.

EXAMPLE I

In a Linde Donauwitz converter, oxy-steel is prepared by blowing oxygen into a liquid iron composition, calcium oxide being added to the composition. In this treatment, gases with dust particles and vaporized metals and vaporized metal compounds evolve from the converter, which gases are washed in a moist washing device and subsequently recovered on a filter. This filter is connected with a vacuum filter for recovering tacky oxy-sludge containing an amount of water as small as possible. This product containing 25% of water has the following composition:

Fe$_2$O$_3$: 75% by weight; SiO$_2$: 2% by weight; Zn: 0,4% by weight. CaO: 10% by weight;

Notwithstanding its high content of iron oxide, this oxy-sludge cannot be added to raw iron oxide to be treated in a blast furnace, as this would lead to zinc accumulation in the blast furnace. Such a high zinc concentration would cause the zinc to evaporate and precipitate onto many controlling and measuring devices and valve, so that operation of the blast furnace would be impaired.

100 kg of the tacky, retained vaporized product is mixed with flue dust obtained by combustion of powdered coal, and said flue dust is recovered on a moist filter.

Spheres, 1 to 2 cm in diameter, which are no longer tacky and thus appropriately processable, are obtained by stirring.

By spraying water over these spheres, rather hard spheres are obtained, which can be used in road construction.

EXAMPLE II 100 kg of tacky oxy-sludge is mixed with 30 kg of dry flue dust and the mixture is intensively stirred, thereby forming a dry mass.

Water is sprayed onto the obtained dry mass, and a non-tacky product is thereby obtained. Drying provides a hard material which can be used as road construction material, as filler material in road construction and for forming sound insulation walls and similar applications.

EXAMPLE III 100 kg of oxy-sludge is mixed with 30 kg of flue dust and 5% of Portland-cement, and the mixture is stirred.

Moistening and drying of the mass provides a mass presenting properties of heavy concrete.

EXAMPLE IV 100 kg of oxy-sludge containing 25% of water is mixed with 150 kg of flue dust. 850 kg of sphere-like particles are subjected in a whirling device to a whirling action without crushing or compressing the particles. Simultaneously 100 kg flue dust is added. Sphere-like particles suitable for road construction.

If the same amount of oxy-sludge is dried in one step, more irregular particles are obtained and 300 kg (instead of 250 kg) of flue dust is used. This constitutes a saving of 15% flue dust.

EXAMPLE V

The process of Example IV is repeated and 3% cement is added as a curing activator.

After being sprayed with water, the sphere-like particles will cure to a very hard product.

Similar results are obtained by adding 4% of calcium chloride or sodium chloride.

Amounts of more than 5% cement are not recommended.

EXAMPLE VI 700 kg of dewatered dredged sludge containing 25% of water is mixed with 150 kg of flue dust, and, in a second step the obtained sphere-like particles are subjected to a whirling action, without crushing or compressing the particles, in the presence of a further 100 kg of flue dust.

The process provides small sphere-like particles which are suitable as road construction material.

EXAMPLE VIII

The process of Example VI is repeated with a gypsum containing sludge obtained in a wet process of preparing phosphoric acid.

EXAMPLE VIII

The process of Example VI is repeated with one or more sludges obtained in purifying phosphoric acid.

What is claimed is:

1. Process for treating a composition containing a moist metal or metal compounds comprising pollution-causing compounds easily lixiviatable from said composition, comprising the steps of
    (a) mixing said composition with fly ash in such a quantity that small sphere-like particles are formed; and then
    (b) mixing said sphere-like particles in the presence of a further amount of said fly ash without crushing said particles.

2. Process according to claim 1, wherein said composition comprises at least one solid product separated from gases produced during the manufacture of steel in steel converters.

3. Process according to claim 1, wherein at least 10% of said fly ash is present in the end product.

4. Process according to claim 3, wherein at least 15% of said fly ash is present in the end product.

5. Process according to claim 3, wherein 25% to 35% of said fly ash is present in the end product.

6. Process according to claim 1, wherein said sphere-like particles are whirled in order to avoid crushing them.

7. Process according to claim 1, wherein one-third to two-thirds of the total amount of said fly ash is used in step (a), and the remainder in step (b).

8. Process according to claim 1, wherein, in step (a), 600 to 800 kg of sludge composition is mixed with 120 to 180 kg of said fly ash, and 70 to 130 kg of said fly ash is added in step (b).

9. Process according to claim 1, wherein said particles are compressed to form a solid mass.

10. Process according to claim 1, comprising the further steps of adding at most 5% of a curing initiator to said composition, and spraying said composition with water.

* * * * *